United States Patent
Stählin et al.

(10) Patent No.: US 8,451,812 B2
(45) Date of Patent: May 28, 2013

(54) USE OF THE WLAN STANDARD FOR A C2C COMMUNICATION BY ADDING NEW PACKET TYPES

(75) Inventors: Ulrich Stählin, Eschborn (DE); Thomas Grotendorst, Eschborn (DE); Carsten Birke, Frankfurt am Main (DE); Marc Menzel, Marburg (DE); Richard Scherping, Dortmund (DE)

(73) Assignee: Continental Teves AG & Co. oHG (DE)

( * ) Notice: Subject to any disclaimer, the term of this patent is extended or adjusted under 35 U.S.C. 154(b) by 177 days.

(21) Appl. No.: 12/746,027

(22) PCT Filed: Dec. 4, 2008

(86) PCT No.: PCT/EP2008/066814
§ 371 (c)(1),
(2), (4) Date: Aug. 24, 2010

(87) PCT Pub. No.: WO2009/071632
PCT Pub. Date: Jun. 11, 2009

(65) Prior Publication Data
US 2010/0303048 A1 Dec. 2, 2010

(30) Foreign Application Priority Data

Dec. 6, 2007 (DE) .......................... 10 2007 059 023
Feb. 22, 2008 (DE) .......................... 10 2008 010 668
Feb. 26, 2008 (DE) .......................... 10 2008 011 196
Oct. 22, 2008 (DE) .......................... 10 2008 043 055
Dec. 4, 2008 (DE) .......................... 10 2008 060 231

(51) Int. Cl.
*H04W 4/00* (2009.01)

(52) U.S. Cl.
USPC .......................................... 370/338

(58) Field of Classification Search
USPC ........................................ 370/338, 346, 449
See application file for complete search history.

(56) References Cited

U.S. PATENT DOCUMENTS

| | | | |
|---|---|---|---|
| 6,865,609 B1 | 3/2005 | Gubbi et al. | |
| 7,425,903 B2 * | 9/2008 | Boss et al. | 340/902 |
| 7,881,868 B2 * | 2/2011 | Greene et al. | 701/301 |
| 7,990,286 B2 * | 8/2011 | Shankwitz et al. | 340/988 |
| 2007/0021133 A1 | 1/2007 | Coulas | |
| 2007/0252723 A1 | 11/2007 | Boss et al. | |

FOREIGN PATENT DOCUMENTS

EP 1 286 506 A2 2/2003

\* cited by examiner

*Primary Examiner* — Chandrahas Patel
(74) *Attorney, Agent, or Firm* — RatnerPrestia

(57) ABSTRACT

C2X communication is made possible efficiently via WLAN by apparatuses and a method for filtering data frames received by a vehicle from a receiver via a WLAN connection, wherein a frame type indicated in a received data frame is used to decide that device to which data in the data frame are transmitted. The C2X communication can be used for recognizing pedestrians. It is also possible to use a plurality of transmission paths and/or UDP.

23 Claims, 2 Drawing Sheets

USE OF THE WLAN STANDARD FOR A C2C COMMUNICATION BY ADDING NEW PACKET TYPES

CROSS REFERENCE TO RELATED APPLICATIONS

This application is the U.S. national phase application of PCT International Application No. PCT/EP2008/066814, filed Dec. 4, 2008, which claims priority to German Patent Application No. 10 2007 059 023.9, filed Dec. 6, 2007, German Patent Application No. 10 2008 010 668.2, filed Feb. 22, 2008, German Patent Application No. 10 2008 011 196.1, filed Feb. 26, 2008, German Patent Application No. 10 2008 043 055.2, filed Oct. 22, 2008 and German Patent Application No. 10 2008 060 231.0, filed Dec. 4, 2008, the contents of such applications being incorporated by reference herein.

FIELD OF THE INVENTION

The present invention relates to methods and apparatuses for selecting data transmitted via a WLAN connection.

BACKGROUND OF THE INVENTION

The Car-to-Car Communication (C2C-Communication) discussed below is a term defined by the Car-to-Car Communication Consortium (C2C-CC), an affiliation between several automobile manufacturers. C2C-CC is developing an open industrial standard for Car-to-Car Communication and for communication between the vehicles and infrastructure devices (traffic lights, etc).

A basis for such Car-to-Car radio systems may be wireless communication systems in the form of WLANs (Wireless Local Area Networks) based on the standard defined by the IEEE under the standard descriptor 802.11, for example (see, for example: IT-Wissen, Das große Onlinelexikon für Informationstechnologie [IT Knowledge, The big online dictionary of information technology]).

C2X communication comprises C2C communication (Car-to-Car Communication) and communication between a vehicle and a further device, which is not a vehicle, such as an infrastructure device (traffic lights, etc.)

For Car-to-X-communication (C2X-communication), a WLAN implementation based on the 802.11p standard is conceivable, said standard not yet having been approved, however. This subform of the WLAN standard 802.11 is distinguished by the opportunity for ad-hoc communication and long ranges. Ad-hoc communication is a mode in which at least two subscribers (radio devices in vehicles, for example) communicate with one another spontaneously (ad hoc), with communication also being able to be effected from a subscriber to a final destination via a plurality of subscribers forwarding the communication as intermediate stations. Besides the ad-hoc mode communication, WLAN is also acquainted with an infrastructure mode, which operates using base stations (access point).

With the currently used radio standard based on IEEE/802.11a/b/g/n, commercially available WLAN routers have the drawback that they require relatively long setup times for the communication (channel setup latencies), which reduces applicability. However, said 802.11a/b/g/n standards have significantly higher data rates than 802.11p, which in turn makes them of interest for multimedia applications.

SUMMARY OF THE INVENTION

It is an object of the present invention to avoid the aforementioned drawbacks and allow efficient C2X communication, for example for pedestrian protection.

The invention allows use of 802.11-WLAN transmission methods (particularly 802.11a or 802.11b or 802.11g or 802.11n) using commercially available WLAN radio engineering both for C2X communication and for communication of other contents (for example for Internet/http/etc. communication, "surfing" the Internet etc.) using the same WLAN radio engineering appliances in a motor vehicle. In this case, the very good range and the relatively short connection setup times of available WLAN standards such as 802.11a/b/g/n can be used efficiently. One significant implementation of the invention is the expansion of the MAC-Layers in the WLAN standard 802.11 (for example 802.11 a/b/g/n), by a data packet type (which can be used for the C2X communication according to aspects of the invention) (for example frame type 3 or frame type 2) with one of the (MAC layer header) frame subtypes 8 to 15 (which have not yet been used), which is ignored by existing WLAN implementations but which allows modified implementations to set up effective C2X communication in parallel (that is to say at the same time and/or by the same WLAN communication terminal, for example) with other WLAN communication (e.g. use of the Internet).

The invention relates to a method for filtering data transmitted to a receiver in a motor vehicle via a WLAN connection, wherein a filter device (for example an expanded MAC software driver) uses at least the frame type contained in a data frame (e.g. "3"; or "2" with subtypes) to decide about that device (device processing C2X data or device processing http data) to which the respective data frame is transferred.

In this case, the frame type of a data frame can be used to decide whether the data frame is transferred to a C2X device or to another (vehicle) device (for example device (e.g. Internet browser) processing http or Internet data further).

The decision about that device to which the data frames are transferred may involve a frame type ("3") or else a combination of a frame type and a particular (MAC layer header) frame subtype (for the frame type "2", one of the (MAC layer header) frame subtypes "8", "9", "10", "11", "12", "13", "14", "15").

The data can be transmitted using a 802.11a or b or g or n standard, in particular.

In line with one exemplary embodiment of the invention, the data are sent from a mobile transmission device of a pedestrian to the receiver which is in the vehicle, wherein the data are then used to produce a warning signal in the vehicle.

The warning signal may be aimed directly at the driver, for example in the form of an audible signal and/or a visual signal and/or a haptic signal (e.g. in the form of a steering wheel vibration). It is also possible for the warning signal to be forwarded to a safety device in the vehicle, such as a driver assistance system, which then initiates appropriate steps.

At this juncture, it should be pointed out that the communication between the different units within the vehicle can take place by wire or wirelessly. For example, in one embodiment of the invention, the driver assistance system can thus communicate wirelessly with the communication system in the vehicle if required.

The mobile transmission device of the pedestrian is a mobile telephone, for example.

In line with a further exemplary embodiment of the invention, the data are additionally also received by the receiver in the vehicle on the basis of a further communication technique. By way of example, the data are simultaneously (redundantly) transmitted on the basis of the WLAN-802.11p standard and on the basis of the WLAN-802.11a or b or g or n standard.

The two parallel transmission paths can either be used simultaneously or be selectively switched on or off. Besides filtering of received data, the invention also relates to a method for sending data frames via a data link installed in a motor vehicle, wherein data from a C2X device (for example a C2X controller module in the vehicle) are provided with a frame type identifier (type 2 with subtypes 8 to 15 or type 3 etc.), whereas data to be sent which come from other vehicle devices (devices processing http/Internet/Multimedia data) are provided with another frame type identifier.

In line with a further exemplary embodiment of the invention, the receiver is a mobile transmission device of a pedestrian, wherein the data contain information about the instantaneous position of the vehicle.

In line with a further exemplary embodiment of the invention, the data are additionally also sent to the receiver on the basis of a further communication technique.

In line with a further exemplary embodiment of the invention, the further communication technique is based on the WLAN-802.11p standard.

In addition, the invention relates to a reception device for a vehicle-based implementation with a filter device for deciding about the forwarding of received data frames to a C2X device (C2X) or other device (http/Internet-Browser/Multimedia etc.) using types indicated in the MAC layer header of the data frame ("3"; "2" with particular subtypes).

The invention also relates to a transmission device for implementation in a vehicle and for sending data frames, with a distinguishing device for distinguishing (prior to sending) data packets originating from a C2X device with (only or at least) one frame type ("2" with subtype 8 to 15 or "3") and for distinguishing data packets with another frame type which originate from another vehicle-based device (Internet/http/Multimedia etc.).

The invention also relates to a communication system for a vehicle having a reception device as described above and a transmission device as described above for carrying out the methods which are described above.

BRIEF DESCRIPTION OF THE FIGURES

The invention is best understood from the following detailed description when read in connection with the accompanying drawings. Included in the drawings is the following figures.

DETAILED DESCRIPTION OF EXEMPLARY EMBODIMENTS

Figure 1:
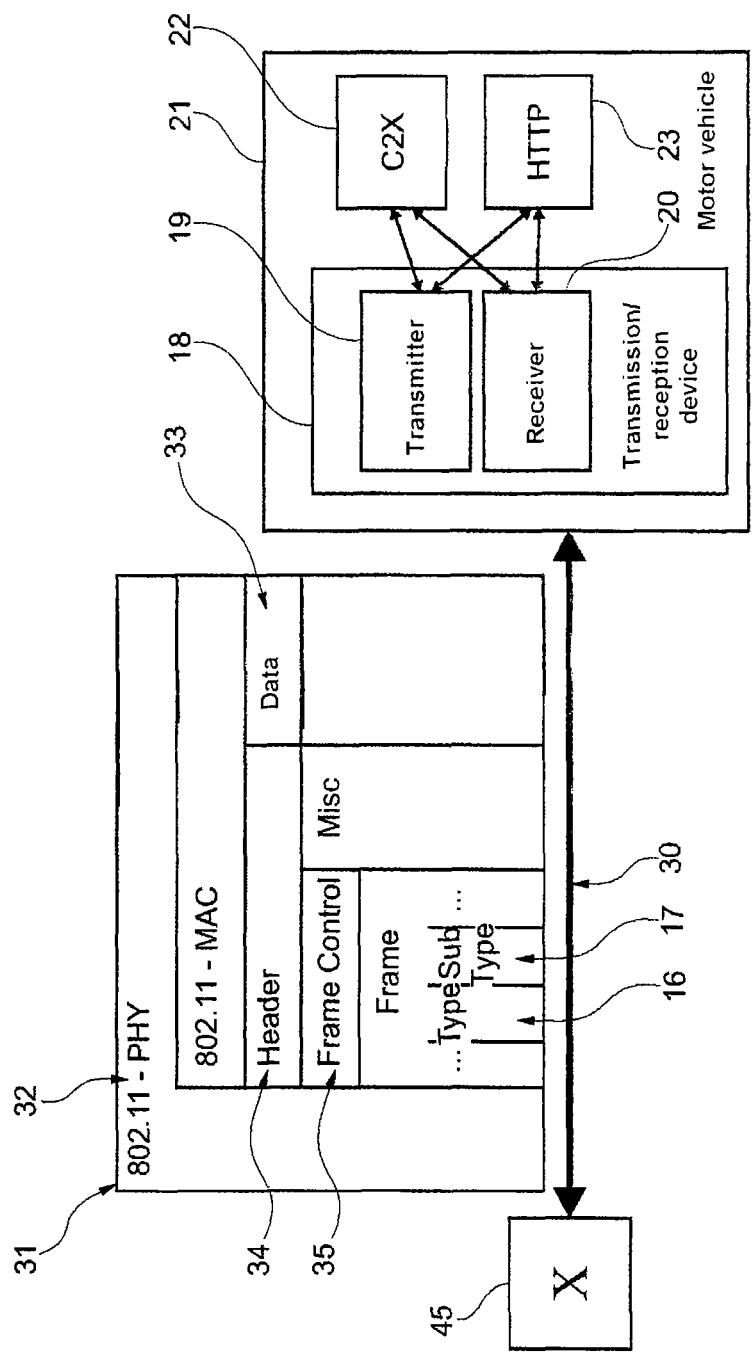
FIG. 1 schematically shows the sending and receiving of data packets by a vehicle via a WLAN connection taking account of frame types.

The illustrations in the Figures are schematic and not to scale.

In the description of the Figures which follows, the same reference numerals are used for the same or similar elements. The 802.11 standard essentially defines two layers:

the physical layer defines the physical transportation medium (frequency, modulation . . . ) and the rudimentary transportation of databytes.

the MAC-layer is responsible for data protection, data flow control and subscriber management at a slightly higher level, this taking place, inter alia, by means of various types of data packets/frames (a data frame may be a data packet, for example a datagram on layer 2 of the OSI model). Hence, the MAC layer allows data packets to be transported safely via WLAN to defined receiving stations (for example in a vehicle), inter alia.

Data originating from higher layers (in the OSI standard model) (for example data originating from (http-based applications) are packed by a MAC layer device into a frame which comprises a header, the actual data (user data) and a frame check sequence. The header in turn contains a "Frame Control" field (35), inter alia, which in turn contains the type of the frame (for example data frame or control frame) and the subtype of the frame. This design is the same for all 802.11 MAC frames.

For some types and subtypes of frames, the 802.11 standard has still not defined any applications, which means that these are free for future expansions and such types and subtypes of current implementations (http/Internet Browser, Multimedia, etc.) are ignored, so that they can be used within the context of this invention. By way of example, the general type number 3 could be used to distinguish data frames relating to C2X communication, or subtypes 8 to 15 of a data frame (for a frame with frame type number 2) could be used to distinguish data frames relating to car-to-X (C2X communication) and hence to allow selection of these frames for C2X applications/devices.

An MAC software driver can be used for the implementation. Such an expanded MAC software driver could then filter out frames or accordingly all packets with the relevant C2X type identifier from the packet stream which it obtains from a physical layer and could forward them directly to a C2X controller module (for example via a software interface or Ethernet, etc) and could package packets which come from a C2X controller into frames of appropriate design and forward them to the physical layer for further sending. This would get around the normal MAC access control or the connection setup for C2X frames, which although safe is lengthy. The C2X controller module could use mechanisms/algorithms, such as that developed by NOW (Network On Wheel), to set up C2X communication—with C2X-specific functions such as geographical routing. Other sources for mechanisms/algorithm are the C2C-CC and the IEEE 1609. For simple functions, such as warning about emergency vehicles by means of a broadcast, these mechanisms/algorithms are not necessary, however. By using an already available field for type recognition in the MAC packets for the expansion, a router modified in this manner would furthermore also allow other communication (for example http/Internet/Multimedia communication). C2X communication would be a simple software add-on for commercially available WLAN routers. When installing WLAN radio engineering in vehicles, this would mean that the hardware which is then present could actually be used for C2X communication only by changing the software.

In this case, it is possible to use conventional hardware as a router. The ever greater prevalence of mobile appliances with WLAN means that it is also possible to couple them to vehicle appliances using Bluetooth, for example, and then to use the WLAN of the mobile appliances as a router, however.

Previous approaches to producing C2X communication using commercially available WLAN routers with commercially available Ethernet protocols (UDP) without other (for example http/Internet/Multimedia) communication in parallel, or the alternative use of routers specified for C2X (for example in the case of the NOW Network On Wheels approach) do not achieve the advantages according to aspects of the invention.

FIG. 1 schematically shows a data frame 31 with a physical layer based on 802.11-PHY (reference 32), an MAC layer based on 802.11-MAC with user data 33 and a header 34, which header 34 contains a frame control data record 35 which contains the frame type 16 (for example type number "2" or type number "3") and an indication of the subtype (for example "8" to "15") with the reference symbol 17 and other details (". . ."). The data record (frame etc. "1") is sent or received by a transmission/reception device 18 (with a transmitter 19 and a receiver 20) which is arranged or mounted in a motor vehicle 21.

When a data frame 31 is received by a transmission/reception device 18 in the vehicle 21, the data type 16 indicated in the data frame 31 is used on its own—or on the basis of the data type 16 ("2") indicated in the data frame 31 and a subtype 17 ("8", "9", "10" . . . "15") indicated in the data frame 31—to decide whether the data frame is transmitted to a C2X device 22 (for example which can process/display data relating to arriving emergency vehicles or a set of traffic lights with a particular traffic light phase in the direction of travel) or to another communication device 23 (e.g. for surfing the Internet). Accordingly, data coming from the C2X device 22 are provided with an indication 16 of a frame type ("2") representing the C2X communication by the transmitter 19—or with an indication 16 of a frame type ("3") and an indication 17 of a frame subtype ("8" to "15")—and are transmitted via an air interface 30 (that is to say through the air by radio) to a receiver 45 (in a vehicle or in an infrastructure device), where they are received and processed further.

At this juncture, it should be noted that the data transmission between the individual components can be effected either by wire or else wirelessly.

Figure 2:
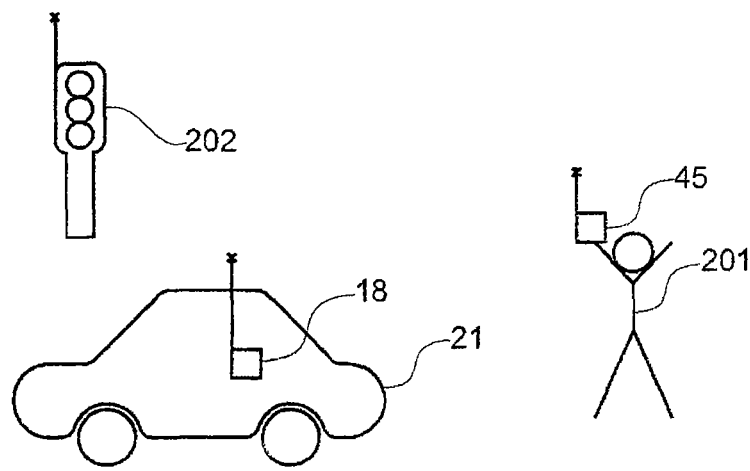
FIG. 2 shows a vehicle with a communication system, and a vehicle-external mobile communication appliance based on an exemplary embodiment of the invention.

FIG. 2 shows a communication system 18, which is integrated in a vehicle 21, and a pedestrian 201, who is holding a mobile communication appliance 45. Within the context of the present invention, the mobile communication appliance 45 is also referred to as a transmitter 45 or receiver 45.

By way of example, the mobile communication appliance 45 is a modern mobile telephone which has a WLAN module and possibly also a position-finding module or navigation module (e.g. GPS module).

The WLAN module has expanded safety engineering, for example by virtue of the MAC layer having been modified as described above.

It is also possible for the safety engineering of the WLAN module to be expanded as follows: timeslots which can be used to perform the communication for safety applications are inserted into the data stream of the WLAN connection (for example on the basis of the WLAN 802.11a/b/g standard and which is used for infotainment applications, for example). These timeslots are synchronized using the GPS time, for example, which is exactly the same in each vehicle. During these timeslots, the infotainment communication is stopped and then continued. The synchronization to the GPS time ensures that all the vehicles interrupt the infotainment communication and switch to safety functions simultaneously.

Since this expansion process is inserted into an existing standard subsequently, it naturally also does not need to be observed by all WLAN appliances. The transmitted information is used not for safety-related actions but rather only for improved driver information.

If the mobile communication appliance 45 now detects the presence of a vehicle by virtue of this expansion, that is to say if a vehicle in proximity to the pedestrian is detected (for example by virtue of a position signal which is periodically emitted by the vehicle being received and analyzed), then the mobile communication appliance 45 sends its position at periodic intervals or as a one-off. This position is ascertained using the integrated GPS module or by means of WLAN position-finding, for example.

When the communication device in the vehicle receives such a message, it can warn the driver about the pedestrian if the latter is at a critical distance from the vehicle. In addition, it is possible to supply or merge systems for pedestrian recognition (e.g. camera-based systems) with this information.

Merging means that the information from 2 sensors (in this case a camera and communication) is combined to form an image of the surroundings and from that point onward is forwarded as one piece of information (for example with greater accuracy or more attributes, etc.).

In the case of mobile telephones for a specific group of people, e.g. for children or for senior citizens, it is additionally possible to send an identifier so that the message can be associated explicitly with this group of people and the warning can be customized to the driver or the merger as appropriate. In the case of children, for example, there can be greater expectation of unpredictable behavior. WLAN and GPS can also be permanently integrated in the clothing or school bag of the pedestrian, for example, in order to allow a warning about children.

If the vehicle-external mobile communication appliance 45 does not have a positioning unit, it nevertheless emits an identifier, but in this case without location information. The ascertainment of the reception field strength in the vehicle and the change in the reception field strength can nevertheless be used to recognize how close the pedestrian is to the vehicle, for example (possibly by virtue of combination with a digital map). It is then possible for an appropriate warning to be output to the driver or a driver assistance system.

The use of infotainment communication, as is available in mobile telephones, and the modification of this communication on a software basis allow pedestrian protection to be implemented without dedicated additional hardware.

In particular, infotainment hardware which is already present in the vehicle or in the mobile communication appliance 45 can be used for safety. Furthermore, the WLAN standard of the mobile communication appliances 45 can be used for pedestrian protection. In particular, it is possible to distinguish children, senior citizens or other selected groups of people in a particular way. Furthermore, communication can be merged with pedestrian recognition. If the mobile communication appliance 45 does not have a positioning unit, the reception field strength can be used for range estimation.

Figure 3:
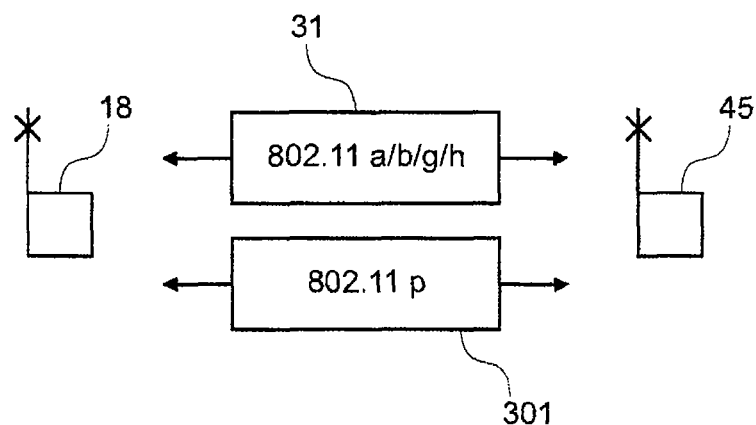
FIG. 3 shows redundant data transmission between the communication system in a vehicle and a mobile communication appliance based on an exemplary embodiment of the invention.

FIG. 3 shows an example of redundant data communication based on an exemplary embodiment of the invention. In this case, various communication techniques for car-to-X communication are used to increase redundancy and to improve performance.

For car-to-X (C2X) communication, it is possible to use a communication technique based on the WLAN-802.11p standard. By way of example, a dedicated control channel can be used (what is known as a dual-receiver concept), or the control channel can be interfaced into the communication channel by means of a GPS-synchronized time frame, for example (what is known as a single-receiver concept).

The dual-receiver concept affords the advantage of a good time response and a relatively high level of safety, whereas the single-receiver concept results in relatively low costs. The dual-receiver concept has a comparatively small overall bandwidth for C2X which, in Europe, is currently only 30 MHz in total for all channels.

Additional communication techniques 301 (e.g. WLAN-802.11a/b/g/n standard) can likewise be used for communication between vehicles or between vehicle and infrastructure or between vehicles and mobile communication units 45.

Since the frequencies used are often not protected and hence can be disturbed by other applications, a two-channel approach allows one of the two channels to be handled by means of the WLAN-802.11p Standard 301 and the other to be handled by means of an additional communication technique.

By way of example, the additional communication technique may be WLAN-802.11a/b/g/n standard-based communication 31.

If there are a plurality of additional communication techniques available, these can be used in parallel in order to further increase the immunity of the data transmission to interference by other applications on the same frequency band.

Fundamental advantages of the second (usually significantly lower) frequency are lower free space attenuation, that is to say longer range for the same transmission power, and the property that lower frequencies are better bent around physical obstacles.

In addition, the differently used communication technologies reduce the probability of both communication channels being disturbed simultaneously or failing simultaneously as a result of implementation errors.

It is also possible to use the WLAN-802.11p standard in the single-receiver configuration and to use the additional communication technique 31 to set up a dual-receiver configuration in parallel therewith. This means that the protected frequency of 802.11p is used to ensure the functionality in all cases, and the additional frequency is used to improve performance (in terms of time response, prioritization, congestion control, . . . ).

The parallel use of the WLAN-802.11p standard at 5.9 GHz and an additional communication technique allows redundancy for safety applications which is advantageous particularly as a result of the different physical propagation properties of the frequencies used. This means that it is also possible to improve coverage as a whole and hence to improve the safety of the overall system.

Since interference in one transmission technique as a result of the other transmission technique can be compensated for, transmission reliability is increased.

The WLAN-802.11p standard can be used as a basis for C2X communication, for example in single-receiver configuration. If needed or for any data traffic, it is possible for the second communication technique or possibly even a third or a plurality of additional communication techniques as well to be used as a control channel for the C2X communication.

By way of example, one of the communication channels may be based on UDP or UDP-light (User Datagram Protocol or Lightweight User Datagram Protocol). User Datagram Protocol (UDP) is a minimal, connectionless network protocol which belongs to the transport layer of the Internet protocol family. In order to associate the data which are sent by means of UDP with the correct program on the target computer or the correct subunit in the vehicle, what are known as ports are used for UDP. In this regard, UDP involves the port number of the service which is intended to receive the data being sent at the same time.

At this juncture, it should be noted that the WLAN-802.11p standard is distinguished by ad-hoc communication and rapid connection setup. Commercially available WLAN routers which use the radio standard based on 802.11a/b/g/n often require very much longer set up times for communication, which means that the effective range can be reduced. In other words: since the vehicle carries on moving, the distance from the object before connection setup is concluded is also reduced. Since data can be interchanged only after connection setup has been concluded, the distance following connection setup can be regarded as the effective range, which naturally sometimes turns out to be shorter than in the case of ad-hoc communication.

As an alternative or in addition the change in the MAC layer (such as when the 802.11a/b/g/n standard is used) or in addition to this, UDP-based communication can take place. UDP communication provides advantages particularly for infrastructure-to-car communication.

By way of example, a C2X subscriber uses a commercially available piece of WLAN hardware to send C2X packets via UDP in broadcast mode. These UDP packets are sent on a previously stipulated radio channel (e.g. channel 1) and on a stipulated UDP port, e.g. 3000, and a broadcast address (IPv4 or IPv6), e.g. 255.255.255.255. A quality assurance method (Quality of Service, QoS) ensures that the UDP data packets are handled with sufficient priority for them also to be actually able to be sent in a prescribed time frame.

A receiver which can process these specific C2X messages always monitors the dedicated channel (e.g. channel 1) and the dedicated UDP port, even if a permanent connection to the WLAN access point has not been set up. For monitoring, it is possible to use the monitor mode, which is supported by most WLAN drivers. The received data packets then have their content filtered on the basis of UDP packets with the dedicated UDP port and a particular C2X identifier, and only the data from these UDP packets are forwarded to the C2X applications.

UDP can be effected as an alternative or in addition to the MAC layer customization for data packets which are sent using WLAN-802.11a/b/g/n.

The structure of the content of the UDP packets may correspond to that of the packets which are otherwise sent/received using the WLAN-802.11p standard, for example. This allows software modules which are possibly developed for the WLAN-802.11p standard (e.g. 1609.2,/3) to be accepted directly or with slight adaptations.

The use of UDP will be illustrated using the example below:

A set of traffic lights 202 (see FIG. 2) is intended to send the status of the traffic lights and information about how long this status is still valid for. The traffic lights are already equipped with an access point for consumer WLAN (e.g. hot spot from Telekom). This access point is now used to send the C2X messages by means of UDP. This does not require any additional hardware, and there are also no changes necessary on the hot spot hardware. Vehicles which are equipped with appropriate receivers are always listening on channel 1, for example, and filter the UDP messages sent there on the basis of an identifier of C2X and then use only this information for C2X. All the other communication in the consumer WLAN remains undisturbed thereby and operates as previously.

This allows C2X functions to be produced with commercially available WLAN radio engineering, maintaining the functionality thereof for "normal" communication. The use of UDP can result in shortened connection set up times for C2X communication using commercially available WLAN engineering and can therefore increase the range. The increase in the range can be understood in comparison with commercially available WLAN engineering with connection set up in this context.

In particular, no or only minimal changes are required on the transmitter. The receiver differs only slightly from receivers which are already available.

In addition, it should be pointed out that "comprising" and "having" do not exclude other elements or steps, and "a" or "an" does not exclude a large number. Furthermore, it should be pointed out that the features or steps which have been described with reference to one of the above exemplary embodiments can also be used in combination with other features or steps from other exemplary embodiments described above.

The invention claimed is:

1. A method for deciding about a further transmission of data frames received by a receiver in a vehicle via a WLAN connection,
   wherein a frame type indicated in a received data frame is used to decide about a device to which data in the data frame are transmitted;
   wherein the data are sent to the receiver by a mobile transmission device of a pedestrian;
   wherein the data can be used to produce a warning signal in the vehicle; and
   wherein a frame type indicated in a received data frame and a frame subtype are used to decide about the device to which the data frame is transmitted.

2. A method for sending a data frame to a receiver via a WLAN connection using a communication standard, said method comprising the steps of:
   providing in a portion of a header of data frames undefined by the communication standard with data from a device processing C2X data with at least one frame type identifier corresponding to a device processing C2X data in the receiver,
   providing in the portion of the header of data frames with data from a device processing data other than the C2X data with a different frame type identifier corresponding to the device processing data other than the C2X data in the receiver, the different frame type identifier being different than the frame type identifier used for data originating from the device processing C2X data, the different frame type identifier being provided before the data frames are sent to the receiver,
   wherein the receiver is a mobile transmission device of a pedestrian; and
   wherein the frame type identifier identifies the device processing C2X data or the device processing data other than C2X data within the receiver for receiving the data frame;
   wherein the data contain information about a position of a vehicle.

3. The method as claimed in claim 2 further comprising the step of sending the data to the receiver on the basis of a further communication technique.

4. The method as claimed in claim 3, wherein the further communication technique is based on the WLAN-802.11p standard.

5. A communication system for a vehicle that is configured to carry out a method as claimed in claim 2.

6. A method for sending a data frame to a receiver via a WLAN connection, said method comprising the steps of:
   providing data frames with data from a device processing C2X data with at least one frame type identifier,
   providing data frames with data from a device processing data other than the C2X data with a different frame type identifier than the frame type identifier used for data originating from the device processing C2X data, before the data frames are sent to the receiver,
   wherein the receiver is a mobile transmission device of a pedestrian,
   wherein the data contain information about a position of a vehicle, and
   wherein prior to sending to a receiver by WLAN, the transmission device distinguishes a frame type and a subtype of the data frame differently for data in a data frame which originate from a C2X device than for data which originate from a device other than the C2X device.

7. A reception device for use in a vehicle using a communication standard, comprising:
   a decision device for deciding about forwarding, by WLAN, received data frames to a device processing C2X data in the receiver or to a device processing other data in the receiver based on the frame type indicated in a portion of a header of the data frames undefined by the communication standard;
   wherein the data frames are sent to a receiver by a mobile transmission device of a pedestrian which sets the frame type in the portion of the header to identify the device processing C2X in the receiver or to identify the device processing the other data in the receiver; and
   wherein the data is configured to be used to produce a warning signal in the vehicle warning the driver of the vehicle of the pedestrian.

8. A communication system for a vehicle having a reception device as claimed in claim 7.

9. A reception device for use in a vehicle, having a decision device for deciding about forwarding, by WLAN, received data frames to a device processing C2X data or to a device processing other data on a basis of at least the frame type of the data frames;
   wherein the data frames are sent to a receiver by a mobile transmission device of a pedestrian;
   wherein the data is configured to be used to produce a warning signal in the vehicle; and
   wherein the decision device takes account of a frame type and a frame subtype of the data frame in a decision.

10. A transmission device for use in a vehicle for sending data frames to a receiver using a communication standard, said transmission device comprising:
    a distinguishing device for 1) distinguishing data frames with at least one frame type in a portion of the header of the data frames undefined by the communication standard and which originate from and correspond to a C2X device prior to sending, and for 2) distinguishing data frames with another frame type in the portion of the header of the frames which originate from and correspond to a device other than the C2X device;
    wherein the data frames are transmitted to the receiver with the header allowing the receiver to identify that the data frames originated from the C2X device or the device other that the C2X device; and
    wherein the data frames are configured to be used as a method for pedestrian protection.

11. A communication system for a vehicle having a transmission device as claimed in claim 10.

12. A transmission device for use in a vehicle for sending data frames to a receiver, said transmission device comprising:
    a distinguishing device for distinguishing data frames with at least one frame type which originate from a C2X device prior to sending, and for distinguishing data frames with a frame type other than a frame type with which data packets originating from the C2X device are distinguished which originate from a device other than the C2X device;

wherein the data frames are configured to be used as a method for pedestrian protection; and wherein the distinguishing is based on a frame type and a frame subtype of the data frame.

13. A method for deciding about a further transmission of data frames received by a receiver in a vehicle via a WLAN connection using a communication standard, comprising:

determining, by the receiver, a frame type indicated in a portion of a header of a received data frame undefined by the communication standard; and forwarding, by the receiver, the received data frame to a processing device of at least two processing devices in the vehicle selected based on the determined frame type, wherein the data are sent to the receiver by a mobile transmission device of a pedestrian which sets the frame type to identify the processing device in the vehicle for receiving the data, and wherein the data is used to produce a warning signal in the vehicle warning a driver of the vehicle of the pedestrian.

14. The method as claimed in claim 13, wherein a data frame with a frame type is transferred to a C2X device.

15. The method as claimed in claim 13, wherein the receiver receives the data via an air interface on a basis of a WLAN-802.11 standard.

16. The method as claimed in claim 13, wherein the data are used to produce a warning signal in the vehicle.

17. The method as claimed in claim 13, wherein the data are received by the receiver on a basis of a further communication technique.

18. The method as claimed in claim 17, wherein the further communication technique is based on the WLAN-802.11p standard.

19. The method as claimed in claim 13, wherein the receiver receives the data via an air interface on a basis of a WLAN-802.11a standard, a WLAN-802.11b standard, a WLAN-802.11g standard or a WLAN-802.11n standard.

20. The method as claimed in claim 13, wherein only one frame type indicated in a received data frame is used to decide about the device to which the data frame is transmitted.

21. A communication system for a vehicle that is configured to carry out a method as claimed in claim 13.

22. The method as claimed in claim 13, wherein at least the frame type is taken as a basis for deciding whether the data are transferred to a device processing C2X data or to a device processing other data.

23. The method as claimed in claim 22, wherein the data are transferred to the device processing C2X data or to the device processing other data by an Ethernet interface or software interface.

* * * * *

UNITED STATES PATENT AND TRADEMARK OFFICE
CERTIFICATE OF CORRECTION

PATENT NO.       : 8,451,812 B2
APPLICATION NO.  : 12/746027
DATED            : May 28, 2013
INVENTOR(S)      : Stählin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 255 days.

Signed and Sealed this
Eighth Day of September, 2015

Michelle K. Lee
*Director of the United States Patent and Trademark Office*